(No Model.)
T. A. EDISON.
VOLTAIC BATTERY.
No. 430,279. Patented June 17, 1890.
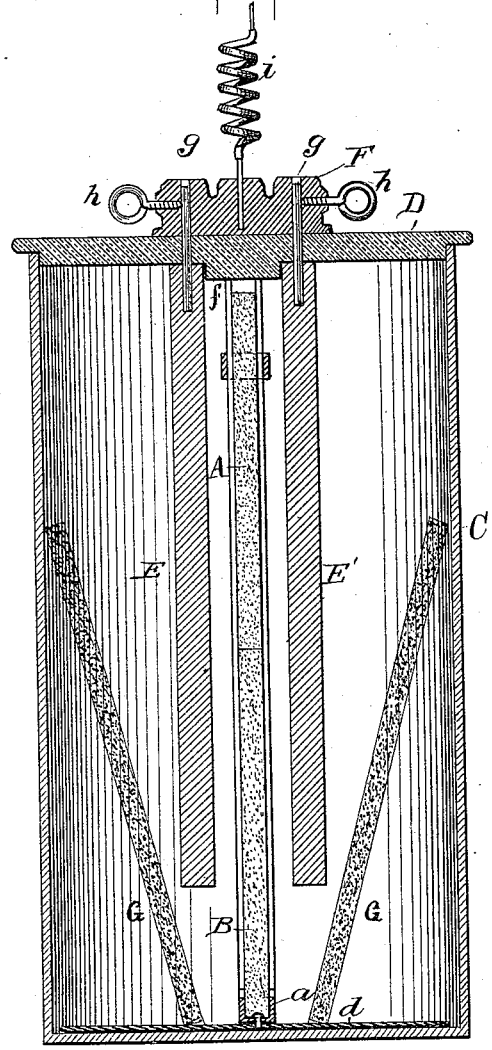
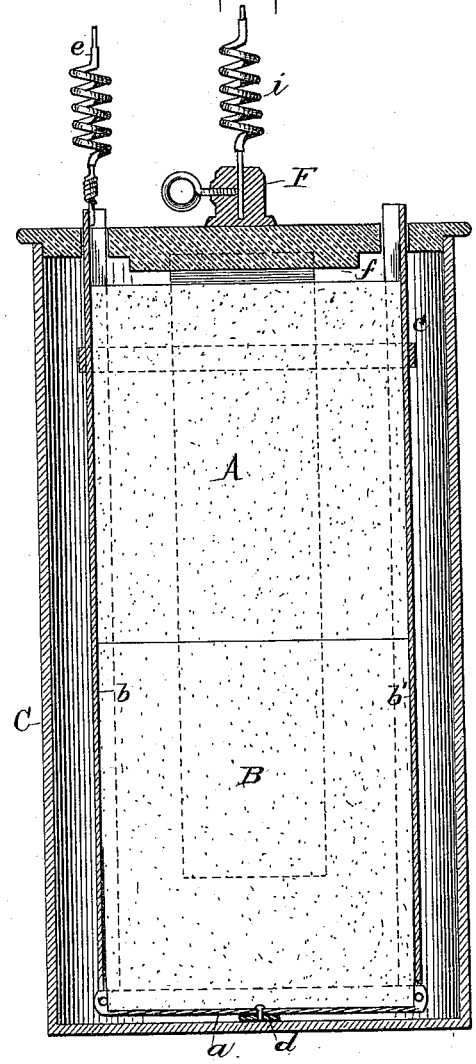
Witnesses
Inventor
Thomas A. Edison
By his Attorneys

UNITED STATES PATENT OFFICE.

THOMAS A. EDISON, OF LLEWELLYN PARK, NEW JERSEY.

VOLTAIC BATTERY.

SPECIFICATION forming part of Letters Patent No. 430,279, dated June 17, 1890.

Application filed July 2, 1889. Serial No. 316,325. (No model.)

*To all whom it may concern:*

Be it known that I, THOMAS A. EDISON, a citizen of the United States, residing at Llewellyn Park, in the county of Essex and State of New Jersey, have invented a new and useful Improvement in Voltaic Batteries, (Case No. 837,) of which the following is a specification.

The object of my invention is to simplify and make compact the construction of that class of voltaic batteries employing oxide of copper as the depolarizing agent at the negative electrode of the battery.

In carrying out my invention I mold the copper oxide into plates by mixing the copper oxide with a slight amount of alkali water—say soda—and then hardening the plates by exposing them to a red heat until the mass is well locked together. The plates of copper oxide thus formed are clamped between copper plates, which form a frame supporting the edges of the oxide plates and holding them together.

The construction of the negative electrode of the battery is the principal feature of the invention; but the invention also consists in other matters of detail, which will presently appear.

In the accompanying drawings, forming a part hereof, Figure 1 is a vertical section of a cell of the battery, and Fig. 2 is a vertical section at right angles to Fig. 1.

A and B are two plates formed by mixing the copper oxide with a slight amount of alkali water, then molding the same, and then exposing the same to a red heat until the mass is locked together. These plates are held by a channeled metal frame, of copper, composed of a bottom piece $a$ and two side pieces $b\ b'$, pivoted to the bottom piece. The pieces $a\ b\ b'$ are channeled, so as to make a frame for supporting the oxide plates A B. To secure the oxide plates in this frame the side pieces $b\ b'$ are swung open, the oxide plates slipped down between them, the lower one resting on the piece $a$, and the side pieces $b\ b'$ are then swung together on the oxide plates and are secured by a copper band $c$, which is slipped over the side pieces $b\ b'$. A crossbar $d$ is secured centrally to the bottom piece $a$ of the frame, so as to insure the central position of the negative electrode in the glass jar C. The top of the glass jar is closed by a cover D, made, preferably, of porcelain and having openings through which the upper ends of the side pieces $b\ b'$ project. A connecting-wire $e$ is secured to one of the projecting ends of the side pieces. The cover D is molded with a central rib $f$ extending transversely part way across it. Two zinc plates E E' are supported from the under side of the cover D on opposite sides of the rib $f$. Metal pins $g$ from the zinc plates pass upwardly through the cover D and enter a metal block F, in which they are secured by set-screws $h$. A wire $i$ for making circuit-connections may be secured to the block F. The rib $f$ maintains the zinc plates E E' a definite distance apart, and between the two zinc plates is located the negative electrode formed of the copper oxide plates A B and the sustaining-frame. This construction produces an exceedingly simple and compact form of the battery and one which can be conveniently renewed, since the copper oxide plates can be readily replaced. I preferably employ two copper oxide plates instead of one, for convenience in molding, and so that the upper plate can be reversed in renewing the plates, so as to immerse that part of the plate which before was above the liquid. A single plate, however, can be employed.

The solution employed is preferably a twenty-five-per-cent. solution of caustic soda; but other caustic alkali—such as caustic potash—may be employed. To obtain this I employ sticks G, Fig. 1, of caustic soda, which are formed by melting the soda and running it into molds. The glass is filled with water and the soda sticks put in. These being made of the material fused into a solid mass, they dissolve slowly, and the glass jar is saved from injury. If the caustic soda were put into the glass jar in the form of powder, the heat produced by its rapid dissolution would be liable to crack the jar.

What I claim as my invention is—

1. A voltaic battery having a negative electrode composed of a plate or plates of molded and solidified oxide of copper removably held in a supporting-frame which embraces the edges of the oxide plate or plates, substantially as set forth.

2. A voltaic battery having a negative electrode composed of one or more plates of copper oxide molded and solidified, and a channeled sustaining-frame composed of parts pivoted together and capable of being opened to permit of the replacement of the oxide plate, substantially as set forth.

3. In a voltaic battery, the combination, with the oxide electrode and sustaining-frame, of the centering cross-piece $d$, substantially as set forth.

4. In a voltaic battery, the combination, with the jar, of the cover having a central rib on its under side, the zinc plates attached to the cover on opposite sides of the rib, and the central copper oxide electrode between said plates, substantially as set forth.

5. The combination, in a voltaic battery, of an electrode and a supporting-frame therefor having a hinged part, whereby the electrode may be easily inserted and withdrawn, substantially as set forth.

6. The combination, in a voltaic battery, of an electrode, a supporting-frame therefor having a hinged part, and a clamp for retaining the frame in the closed position around the electrode, substantially as set forth.

This specification signed and witnessed this 15th day of June, 1889.

THOS. A. EDISON.

Witnesses:
WILLIAM PELZER,
RICHD. N. DYER.